United States Patent
Gross et al.

(10) Patent No.: US 7,613,580 B2
(45) Date of Patent: Nov. 3, 2009

(54) METHOD AND APPARATUS FOR GENERATING AN EMI FINGERPRINT FOR A COMPUTER SYSTEM

(75) Inventors: Kenny C. Gross, San Diego, CA (US); Aleksey M. Urmanov, San Diego, CA (US); Ramakrishna C. Dhanekula, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 253 days.

(21) Appl. No.: 11/787,027

(22) Filed: Apr. 12, 2007

(65) Prior Publication Data

US 2008/0252309 A1    Oct. 16, 2008

(51) Int. Cl.
*G06F 11/30* (2006.01)
(52) U.S. Cl. .............................. 702/89; 70/77; 70/115; 324/628; 324/76.21
(58) Field of Classification Search ................. 702/89, 702/57–59, 182, 185, 76–77, 115; 324/627, 324/72, 537, 750, 763, 628, 76.21; 714/47
See application file for complete search history.

(56) References Cited

U.S. PATENT DOCUMENTS

| | | | |
|---|---|---|---|
| 6,296,205 | B1 | 10/2001 | Hanson et al. |
| 2003/0204743 | A1 | 10/2003 | Devadas et al. |
| 2006/0043979 | A1 | 3/2006 | Wu |
| 2006/0236123 | A1* | 10/2006 | Barr .......................... 713/189 |

FOREIGN PATENT DOCUMENTS

| WO | 03102610 A2 | 12/2003 |
|---|---|---|
| WO | 2007021392 A2 | 2/2007 |

OTHER PUBLICATIONS

Agilent Technologies; Agilent Spectrum Anaylsis Basics, Application Note 150, XP-002488439: http://www-csite.deis.unibo.it/Staff/giorgetti/lens/materiale/Agilent_Spec_Analyzer_5952-0292.pdf.
Parrish, Jr. et al., An Adaptive Pattern Analysis System for Isolating EMI, Pattern Recognition vol. 19, Issue 5 (1986) pp. 397-406, ISSN:0031-3203 XP-000818732.
Gross, Kenny et al., "Proactive Detection of Software Aging Mechanisms in Performance Critical Computers", Proceedings of the 27th Annual NASA Goddard/IEEE Software Engineering Workshop (SEW-27'02) 0-7695-1855-9/03.
Gribok, Andrei et al., "Use of Kernel Based Techniques for Sensor Validation in Nuclear Power Plants", pp. 1-15, International Topical Meeting on Nuclear Plant Instrumentation, Controls, and Human-Machine Interface Technologies (NPIC&HMIT 2000) Washington DC. Nov. 2000, XP008098438.

* cited by examiner

*Primary Examiner*—Drew A Dunn
*Assistant Examiner*—Hien X Vo
(74) *Attorney, Agent, or Firm*—Park, Vaughan & Fleming LLP

(57) ABSTRACT

A system that generates an electromagnetic interference (EMI) fingerprint for a computer system is presented. During operation, the system executes a load script on the computer system, wherein the load script includes a specified sequence of operations. Next, the system receives EMI signals generated by the computer system while executing the load script. The system then generates the EMI fingerprint from the received EMI signals.

25 Claims, 4 Drawing Sheets

METHOD AND APPARATUS FOR GENERATING AN EMI FINGERPRINT FOR A COMPUTER SYSTEM

RELATED APPLICATION

The subject matter of this application is related to the subject matter in a non-provisional application by inventors Kenny C. Gross, Aleksey M. Urmanov, Ramakrishna C. Dhanekula, and Steven F. Zwinger entitled, "Using EMI Signals To Facilitate Proactive Fault Monitoring in Computer Systems," having Ser. No. 11/787,003, and filing date Apr. 12, 2007.

BACKGROUND

1. Field of the Invention

The present invention relates to techniques for identifying a computer system. More specifically, the present invention relates to a method and apparatus for generating an EMI fingerprint for a computer system.

2. Related Art

A given semiconductor chip design can be implemented in a number of different versions of the chip. For example, the different versions can include chips with varying speeds and chips with incremental changes to the functionality. Hence, it is often useful to be able to identify the specific version of a semiconductor chip.

One technique for identifying a semiconductor chip involves reading the serial number printed on the package for the chip. Unfortunately, if the semiconductor chip is integrated within a computer system, this is time-consuming and burdensome because the computer system must be opened to perform a visual inspection of the chip. Furthermore, this process may additionally involve identifying one of many system boards within a server containing the semiconductor chip, and pulling the system board from the server. One solution to this problem is to include an identifier within the semiconductor chip which can be read by an operating system. Unfortunately, some semiconductor chips do not include identifiers which can be read by an operating system. Furthermore, some operating systems may not provide a mechanism for reading an identifier from a semiconductor chip.

It is important to be able to correctly identify semiconductor chips within a computer system if the computer system is to be exported. For example, a government may restrict the computational power of computer systems which can be exported to specified countries. However, an unscrupulous vendor may modify a computer system that does not violate the export control restriction by substituting a more powerful central processing unit (CPU) into the computer system, and may then attempt to ship the modified computer system to an export-controlled country. Border inspectors who visually inspect the model number of the computer system may not be able to determine that the computer system has been modified. Furthermore, the vendor may modify the operating system so that the identifier for the substituted semiconductor chip is identified as a less-powerful chip. Hence, booting up the computer system in order to determine the CPU identifier embedded within the CPU is not necessarily a reliable technique.

Another problem is the possibility that a CPU within the computer system may be substituted with a spy chip, or a piggy-back semiconductor chip may be coupled to the CPU to obtain information from the computer system. Unfortunately, it is difficult to detect this type of tampering. A system administrator must open the computer system and visually inspect the components within the computer system to determine whether the computer system has been tampered with. In the case where a spy chip is substituted for the CPU chip, a visual inspection may not suffice if the serial number of the chip and the identifier within the chip have been set to match the serial number and identifier for the original CPU.

Hence, what is needed is a method and an apparatus for identifying a semiconductor chip without the problems described above.

SUMMARY

One embodiment of the present invention provides a system that generates an electromagnetic interference (EMI) fingerprint for a computer system. During operation, the system executes a load script on the computer system, wherein the load script includes a specified sequence of operations. Next, the system receives EMI signals generated by the computer system while executing the load script. The system then generates the EMI fingerprint from the received EMI signals.

In one embodiment, while receiving the EMI signals, the system receives an EMI time-series signature.

In one embodiment, while generating the EMI fingerprint from the EMI time-series signature, the system transforms the EMI time-series signature from the time domain to the frequency domain. The system then produces a set of amplitude time series for specified frequencies from the frequency domain representation.

In one embodiment, the specified frequencies can include: a frequency window bounded by a specified maximum frequency and a specified minimum frequency; or a specified set of frequencies.

In one embodiment, while transforming the EMI time-series signature from the time domain to the frequency domain, the system uses a Fast Fourier Transform (FFT).

In one embodiment, while receiving the EMI signals, the system receives the EMI signals from an antenna which is used to sense EMI signals generated by the computer system.

In one embodiment, the antenna is placed inside of a chassis for the computer system.

In one embodiment, the antenna is placed within a specified distance from a central processing unit (CPU) for the computer system.

In one embodiment, the antenna is placed outside of a chassis for the computer system.

In one embodiment, the antenna can be a wire.

In one embodiment, the load script can include one or more of: a sequence of operations that produces a load profile that oscillates between specified CPU utilization percentages; and a sequence of operations that produces a customized load profile.

In one embodiment, the system uses the EMI fingerprint to determine whether the computer system has been tampered with.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention transforms EMI time series signatures into a "telemetric fingerprint" (EMI fingerprint) that is unique for a given computer system with a given set of components executing a given sequence of code. This embodiment makes it easier to determine when a computer system has been tampered with because the EMI fingerprint can be compared to a reference EMI fingerprint for the computer system.

One embodiment of the present invention provides a non-invasive technique for determining the type of CPU and the clock speed of the CPU within a computer system without having to physically remove system boards and visually read the serial number of the CPU.

Computer System

Figure 1:
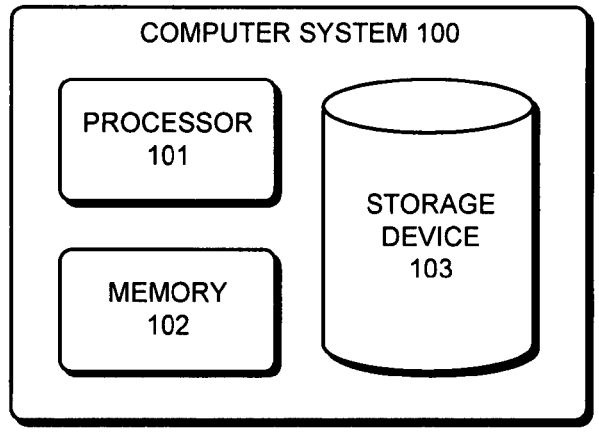
FIG. 1 illustrates a computer system.

FIG. 1 illustrates a computer system 100. Computer system 100 includes processor 101, memory 102, and storage device 103.

Processor 101 can generally include any type of processor, including, but not limited to, a microprocessor, a mainframe computer, a digital signal processor, a personal organizer, a device controller, a computational engine within an appliance, and any other processor now known or later developed. Furthermore, processor 101 can include one or more cores.

Note that although FIG. 1 illustrates computer system 100 with one processor, computer system 100 can include more than one processor. In a multi-processor configuration, the processors can be located on a single system board, or multiple system boards.

Memory 102 can include any type of memory, including but not limited to, dynamic random access memory (DRAM), static random access memory (SRAM), flash memory, read only memory (ROM), and any other type of memory now known or later developed.

Storage device 103 can include any type of storage device that can be coupled to a computer system. This includes, but is not limited to, magnetic, optical, magneto-optical storage devices, storage devices based on flash memory and/or battery-backed up memory, and any other storage device now known or later developed.

Note that during operation, computer system 100 generates electromagnetic interference (EMI) signals which can be detected.

Telemetric Fingerprinting

Figure 2:
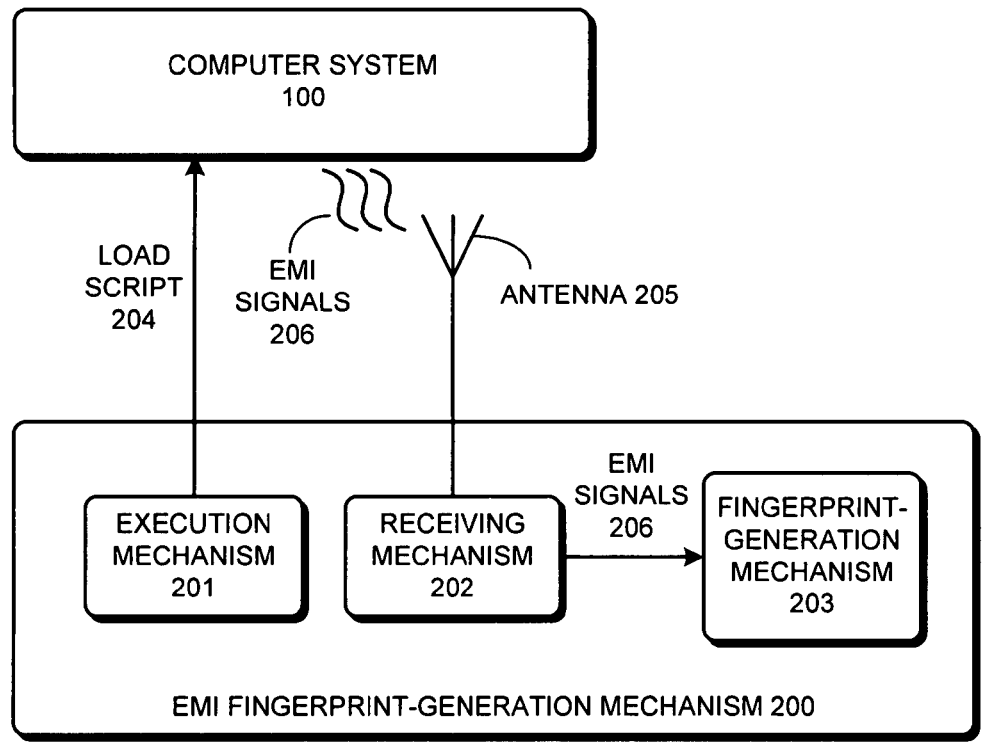
FIG. 2 illustrates an EMI fingerprint-generation mechanism in accordance with an embodiment of the present invention.

FIG. 2 illustrates an EMI fingerprint-generation mechanism 200 in accordance with an embodiment of the present invention. EMI fingerprint-generation mechanism 200 includes: execution mechanism 201, receiving mechanism 202, and fingerprint-generation mechanism 203.

In one embodiment of the present invention, EMI fingerprint-generation mechanism 200 is located within computer system 100. In another embodiment of the present invention, EMI fingerprint-generation mechanism 200 is coupled to computer system 100. For example, EMI fingerprint-generation mechanism 200 can be coupled to computer system 100 using a wired or wireless network, or a direct connection though a cable. In another embodiment of the present invention, some of the components within EMI fingerprint-generation mechanism 200 are located within computer system 100 and some of the components within EMI fingerprint-generation mechanism 200 are located outside of computer system 100.

In one embodiment of the present invention, execution mechanism 201 executes load script 204 on computer system 100. For example, execution mechanism 201 can transmit load script 204 and a command to execute load script 204 across a network to computer system 100. Similarly, execution mechanism 201 can be an application running on computer system 100. In this case, execution mechanism 201 executes load script 204 on computer system 100.

In one embodiment of the present invention, load script 204 can include one or more of: a sequence of operations that produces a load profile that oscillates between specified central processing unit (CPU) utilization percentages; and a sequence of operations that produces a customized load profile. Note that a customized load profile can be used to produce a unique fingerprint which is difficult to spoof.

In one embodiment of the present invention, during the execution of load script 204, receiving mechanism 202 receives EMI signals 206 generated by computer system 100. (Note that EMI signals are also generated during normal operation of computer system 100.) In one embodiment of the present invention, receiving mechanism is coupled to antenna 205, which detects EMI signals 206 generated by computer system 100. In one embodiment of the present invention, the EMI signals are amplified.

In one embodiment of the present invention, antenna 205 can include: a dipole antenna, a Yagi-Uda antenna, a loop antenna, an electrical short antenna (e.g., an open-ended a wire less than a quarter wavelength), a fractal antenna, a parabolic antenna, a microstrip antenna, a quad antenna, a random wire antenna (e.g., an open-ended wire greater than one wavelength), a beverage antenna, a helical antenna, a phased array antenna, and any other type of antenna now known or later developed.

In one embodiment of the present invention, antenna 205 is an insulated wire with a fixed length of the insulation stripped off of the insulated wire. In this embodiment, the stripped end of the insulated wire is open to free space and the other end of the wire is coupled to receiving mechanism 202.

In one embodiment of the present invention, the antenna is placed inside of the chassis for computer system 100. In another embodiment of the present invention, the antenna is placed outside of the chassis for computer system 100.

In one embodiment of the present invention, the antenna is placed a specified distance from a central processing unit (CPU) for the computer system. In another embodiment of the present invention, multiple antennas can be located within a specified distance from the CPUs of a multiprocessor computer system. In this embodiment, the receiving mechanism 202 receives EMI signals sensed by each antenna located within a specified distance from the CPUs. For example, one antenna can be located within a specified distance of each CPU. In another embodiment of the present invention, multiple antennas can be located within a specified distance from cores of a multi-core CPU. For example, one antenna can be located within a specified distance of each core of a multi-core CPU.

In one embodiment of the present invention, antennas can be located at specified locations within the computer system.

Figure 3:
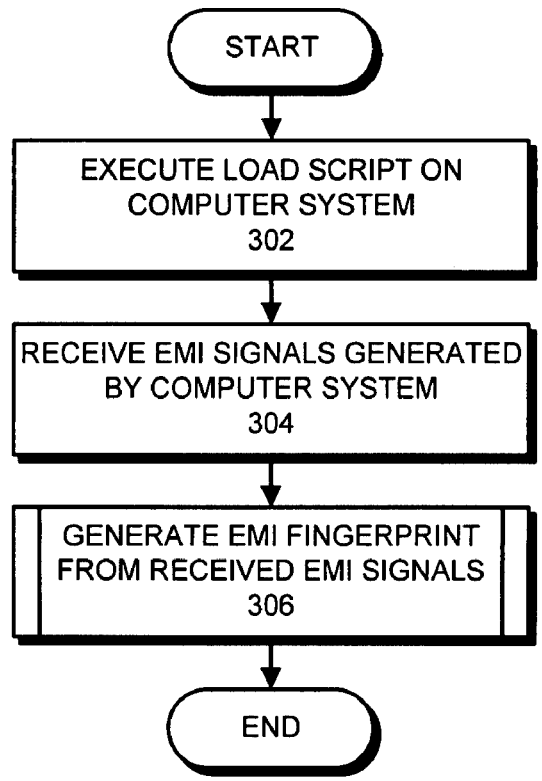
FIG. 3 presents a flow chart illustrating the process of generating an electromagnetic interference (EMI) fingerprint in accordance with an embodiment of the present invention.

In one embodiment of the present invention, fingerprint-generation mechanism 203 generates an EMI fingerprint from EMI signals 206. FIG. 3 presents a flow chart illustrating the process of generating an electromagnetic interference (EMI) fingerprint in accordance with an embodiment of the present invention. The process begins when the system executes a load script on the computer system, wherein the load script includes a specified sequence of operations (step 302). Next, the system receives EMI signals generated by the computer system while executing the load script (step 304). In one embodiment of the present invention, while receiving the EMI signals, the system receives an EMI time-series signature. In one embodiment of the present invention, the EMI time-series signature is a subset of the EMI time-series signals which are produced during the execution of the load script.

Returning to FIG. 3, the system then generates the EMI fingerprint from the received EMI signals (step 306). Step 306 is described in more detail in reference to FIG. 4.

Figure 4:
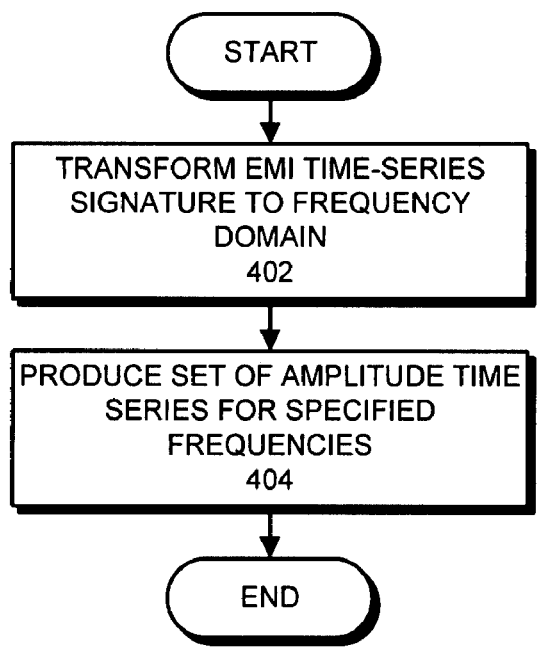
FIG. 4 presents a flow chart illustrating the process of generating an EMI fingerprint from an EMI time-series signature in accordance with an embodiment of the present invention.
Figure 5:
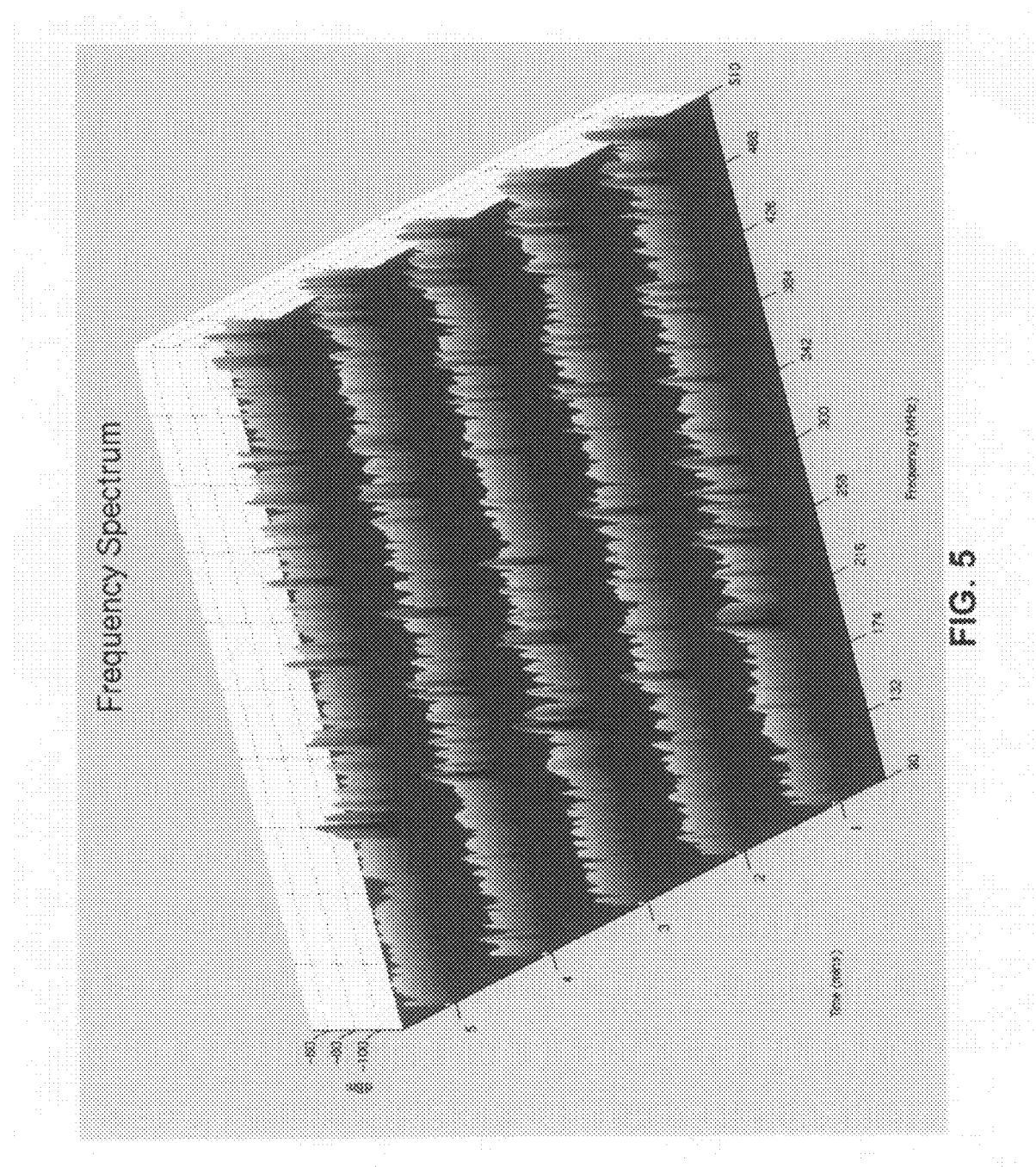
FIG. 5 illustrates a portion of a frequency spectrum corresponding to an EMI signature in accordance with an embodiment of the present invention.

FIG. 4 presents a flow chart illustrating the process of generating an EMI fingerprint from an EMI time-series signature in accordance with an embodiment of the present invention. The process begins when the system transforms the EMI time-series signature from the time domain to the frequency domain (step 402). The system then produces a set of amplitude time series for specified frequencies from the frequency domain representation (step 404). For example, FIG. 5 illustrates several amplitude time series wherein the frequency spectrum was sampled once per minute at specified frequencies. In one embodiment of the present invention, these time-series are used as a fingerprint for the given computer system running the given load script.

In one embodiment of the present invention, the specified frequencies can include: a frequency window bounded by a specified maximum frequency and a specified minimum frequency; or a specified set of frequencies.

In one embodiment of the present invention, transforming the EMI time-series signature from the time domain to the frequency domain involves using a Fast Fourier Transform (FFT). In other embodiments, other transform functions can be used. For example, these transforms can include, but are not limited to, a Laplace transform, a discrete Fourier transform, a Z-transform, and any other transform technique now known or later developed.

In one embodiment of the present invention, the EMI fingerprint is used to detect whether the computer system has been tampered with. In one embodiment of the present invention, the EMI fingerprint is compared to a telemetry fingerprint generated from telemetry signals collected from sensors within the computer system during execution of the load script. Comparing the EMI fingerprint to the telemetry fingerprint makes it difficult for a load script to be created to spoof an EMI fingerprint (i.e., when the components are not genuine). A real-time telemetry system that generates telemetry signals used to generate a telemetry fingerprint is described below.

Real-Time Telemetry System

Figure 6:
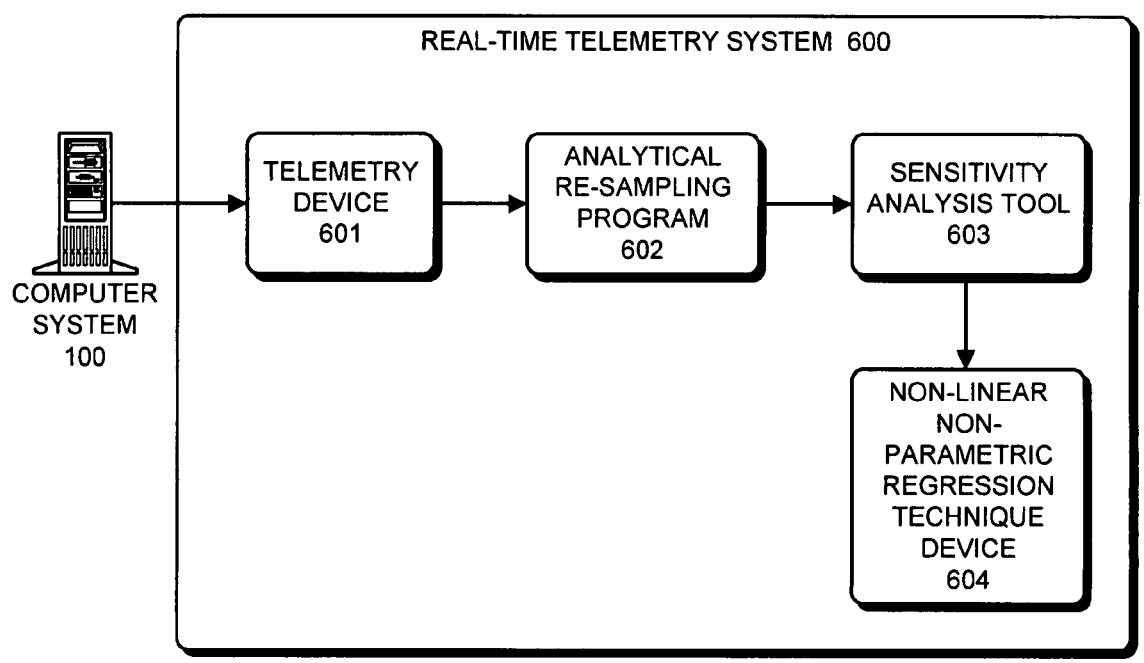
FIG. 6 presents a block diagram of a real time telemetry system which monitors a computer system in accordance with an embodiment of the present invention.

FIG. 6 presents a block diagram of a real-time telemetry system 600 which monitors computer system 100 in accordance with an embodiment of the present invention. Real-time telemetry system 600 contains telemetry device 601, analytical re-sampling program 602, sensitivity analysis tool 603, and non-linear, non-parametric (NLNP) regression technique device 604. Telemetry device 601 gathers information from the various sensors and monitoring tools within computer system 100, and directs the signals to local or remote locations that contain analytical re-sampling program 602, sensitivity analysis tool 603, and NLNP regression technique device 604. In one embodiment of the present invention, analytical re-sampling program 602, sensitivity analysis tool 603, and NLNP regression technique device 604 are located within computer system 100. In another embodiment of the present invention, analytical re-sampling program 602, sensitivity analysis tool 603, and NLNP regression technique device 604 are located on a plurality of computer systems including computer system 100 and other remote computer systems.

The analytical re-sampling program 602 ensures that the signals have a uniform sampling rate. In doing so, analytical re-sampling program 602 uses interpolation techniques, if necessary, to fill in missing data points, or to equalize the sampling intervals when the raw data is non-uniformly sampled.

After the signals pass through analytical re-sampling program 602, they are aligned and correlated by sensitivity analysis tool 603. For example, in one embodiment of the present invention sensitivity analysis tool 603 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 603.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 603.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 604.

Non-Linear, Non-Parametric Regression

In one embodiment of the present invention, the NLNP regression technique is a multivariate state estimation technique (MSET). The term "MSET" as used in this specification refers to a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

The present invention uses an advanced pattern recognition approach, which takes data gathered from software variables reported by the operating system, hardware variables generated by the sensors in the computer system, and a model of a properly-functioning computer system which is generated during a training phase.

The present invention continuously monitors a variety of instrumentation signals in real time during operation of the server. (Note that although we refer to a single computer system in this disclosure, the present invention also applies to a collection of computer systems).

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for a storage devices such as disk drives, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. One embodiment of the present invention uses a class of techniques known as non-linear, non-parametric (NLNP) regression techniques, such as the MSET. Alternatively, the present invention can use other pattern recognition techniques, such as neural networks or other types of NLNP regression. Another embodiment of the present invention uses a linear regression technique. In each case, the pattern recognition module "learns" how the behavior of the monitored variables relates to a properly-functioning computer system. The pattern recognition module then generates a model of the properly-functioning computer system.

In one embodiment of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating an electromagnetic interference (EMI) fingerprint for a computer system, comprising:
   executing a load script on the computer system, wherein the load script includes a specified sequence of operations, wherein the specified sequence of operations produces a customized load profile that generates a unique EMI fingerprint;
   receiving EMI signals generated by the computer system while executing the load script; and
   generating the EMI fingerprint from the received EMI signals.

2. The method of claim 1, wherein receiving the EMI signals involves receiving an EMI time-series signature.

3. The method of claim 2, wherein generating the EMI fingerprint from the EMI time-series signature involves:
   transforming the EMI time-series signature from the time domain to the frequency domain; and
   producing a set of amplitude time series for specified frequencies from the frequency domain representation.

4. The method of claim 3, wherein the specified frequencies can include:
   a frequency window bounded by a specified maximum frequency and a specified minimum frequency; or
   a specified set of frequencies.

5. The method of claim 3, wherein transforming the EMI time series signature from the time domain to the frequency domain involves using a Fast Fourier Transform (FFT).

6. The method of claim 1, wherein receiving the EMI signals involves receiving the EMI signals from an antenna which is used to sense EMI signals generated by the computer system.

7. The method of claim 6, wherein the antenna is placed inside of a chassis for the computer system.

8. The method of claim 7, wherein the antenna is placed within a specified distance from a central processing unit (CPU) for the computer system.

9. The method of claim 6, wherein the antenna is placed outside of a chassis for the computer system.

10. The method of claim 6, wherein the antenna can be a wire.

11. The method of claim 1, wherein the load script includes:
   a sequence of operations that produces a load profile that oscillates between specified central processing unit (CPU) utilization percentages.

12. The method of claim 1, further comprising using the EMI fingerprint to determine whether the computer system has been tampered with.

13. A computer-readable storage medium storing instructions that when executed by a computer cause the computer to perform a method for generating an electromagnetic interference (EMI) fingerprint for a computer system, wherein the method comprises:
   executing a load script on the computer system, wherein the load script includes a specified sequence of operations, wherein the specified sequence of operations produces a customized load profile that generates a unique EMI fingerprint;
   receiving EMI signals generated by the computer system while executing the load script; and
   generating the EMI fingerprint from the received EMI signals.

14. The computer-readable storage medium of claim 13, wherein receiving the EMI signals involves receiving an EMI time-series signature.

15. The computer-readable storage medium of claim 14, wherein generating the EMI fingerprint from the EMI time-series signature involves:
   transforming the EMI time-series signature from the time domain to the frequency domain; and
   producing a set of amplitude time series for specified frequencies from the frequency domain representation.

16. The computer-readable storage medium of claim 15, wherein the specified frequencies can include:
   a frequency window bounded by a specified maximum frequency and a specified minimum frequency; or
   a specified set of frequencies.

17. The computer-readable storage medium of claim 15, wherein transforming the EMI time series signature from the time domain to the frequency domain involves using a Fast Fourier Transform (FFT).

18. The computer-readable storage medium of claim 13, wherein receiving the EMI signals involves receiving the EMI signals from an antenna which is used to sense EMI signals generated by the computer system.

19. The computer-readable storage medium of claim 18, wherein the antenna is placed inside of a chassis for the computer system.

20. The computer-readable storage medium of claim 19, wherein the antenna is placed within a specified distance from a central processing unit (CPU) for the computer system.

21. The computer-readable storage medium of claim 18, wherein the antenna is placed outside of a chassis for the computer system.

22. The computer-readable storage medium of claim 18, wherein the antenna can be a wire.

23. The computer-readable storage medium of claim 13, wherein the load script can include:
   a sequence of operations that produces a load profile that oscillates between specified central processing unit (CPU) utilization percentages.

24. The computer-readable storage medium of claim 13, wherein the method further comprises using the EMI fingerprint to determine whether the computer system has been tampered with.

25. An apparatus that generates an electromagnetic interference (EMI) fingerprint for a computer system, comprising:
   an execution mechanism configured to execute a load script on the computer system, wherein the load script includes a specified sequence of operations, wherein the specified sequence of operations produces a customized load profile that generates a unique EMI fingerprint;
   a receiving mechanism configured to receive EMI signals generated by the computer system while executing the load script; and
   a fingerprint-generation mechanism configured to generate the EMI fingerprint from the received EMI signals.

* * * * *